Aug. 21, 1923.
H. G. JOHNSTON
GAS SCRUBBER
Filed Sept. 13, 1922
1,465,397
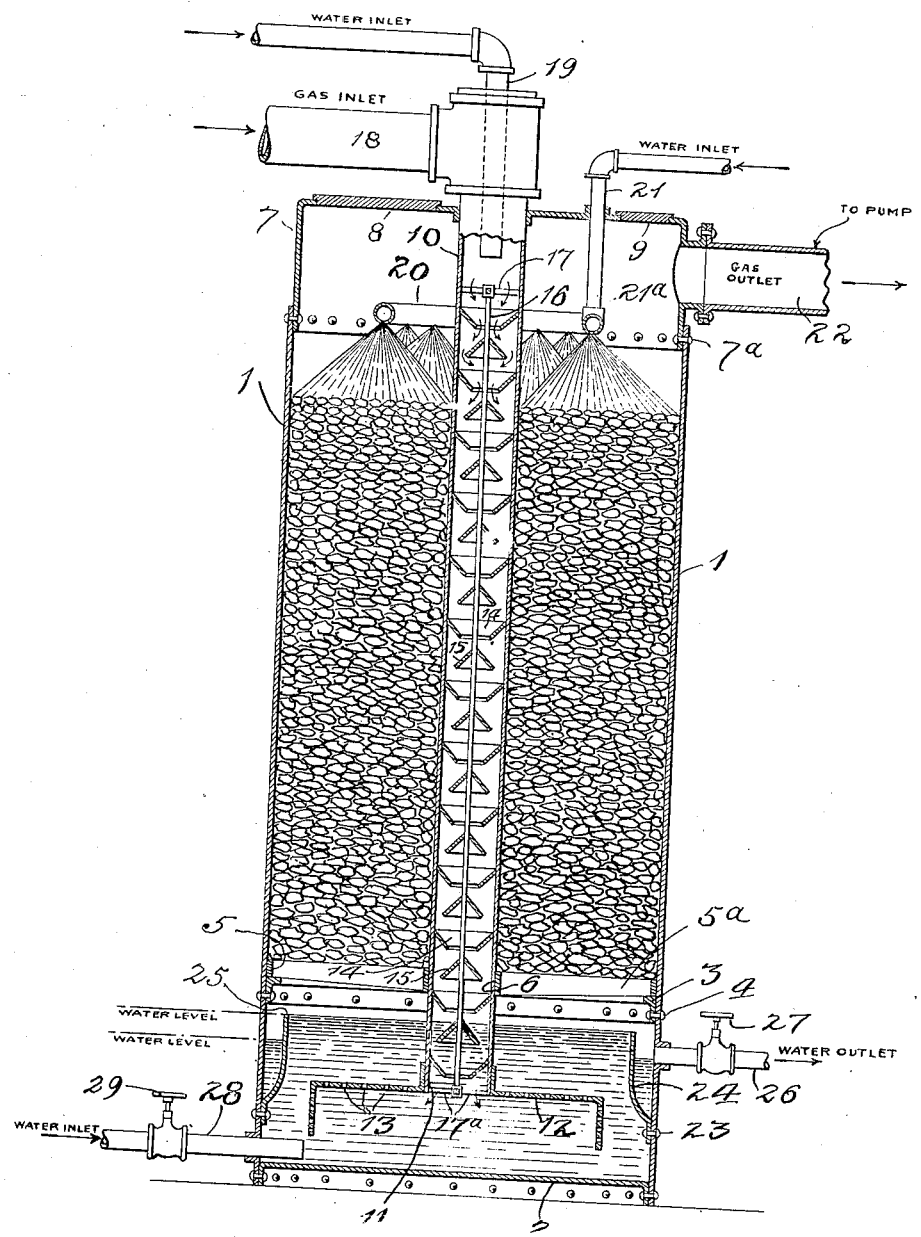

Patented Aug. 21, 1923.

1,465,397

UNITED STATES PATENT OFFICE.

HORACE G. JOHNSTON, OF CORSICANA, TEXAS.

GAS SCRUBBER.

Application filed September 13, 1922. Serial No. 588,056.

*To all whom it may concern:*

Be it known that HORACE G. JOHNSTON, a citizen of the United States, residing at Corsicana, in the county of Navarro and State of Texas, has invented certain new and useful Improvements in Gas Scrubbers; and he does hereby declare the following to be a full, clear, and exact description of the invention, such as will enable others skilled in the art to which it appertains to make and use the same.

This invention relates to apparatus for separating impurities from gas, and more particularly for purifying producer-gas made from lignite or bituminous coal, separating the tar, oil and other liquids and solids therefrom and 'continually drawing off the tar and oil, which constitute a valuable by product of the process.

An object of the invention is to remove completely from gas, particularly combustible gas, all impurities, thus rendering, for example, producer gas susceptible of use in internal combustion engines without gumming or carbonizing the cylinders, pistons and valves, or rendering such gas capable of being completely burned in any gas combustion apparatus.

The invention consists in a scrubbing apparatus provided with a water seal into which an inlet conduit for the gas discharges, a means for supplying wash water to the water seal, a draw off conduit for continually floating off the tar, oil and other floatable impurities, a means for reducing the pressure of the gas escaping from the conduit into the water, and for widely distributing the gas through the water; it also consists in combinations and details of construction more specifically described hereinafter, defined in the appended claims and illustrated in the accompanying drawing.

The drawing illustrates the improved scrubber in vertical longitudinal section.

In the drawing, 1 indicates the side wall of an air tight container, which may be a cylinder having a bottom 2, a circular supporting ring 3 of angular cross section riveted or otherwise secured, as at 4, to the wall 1 at a suitable distance above the bottom 2. Resting upon the ring 3 is a grating, or perforated supporting member 5, having a central opening at 6. The supporting member 5 may comprise radiating grate bars 5$^a$. The upper end of the container is closed, as by a cap 7, riveted as at 7$^a$, or otherwise secured to the upper end of wall 1. Cap 7 may have suitable man holes or other openings therein, closed by covers 8 and 9. Extending through the cap 7, thence downward within the container through the opening 6 in the grating 5, preferably in the center of the container, is a gas inlet conduit 10 having, below the grating 5, an open discharge end 11. The discharge end of said conduit is surrounded by a baffle 12 secured thereto, which is preferably in the form of an inverted dish having a plurality of perforations 13, the aggregate area of which should be greater than the cross sectional area of the conduit 10. Within conduit 10 is a vertical series of baffles 14 and 15. These baffles may be of any approved style; those shown consist of conoidal shells alternately disposed in relatively inverted positions, each baffle 14 having a central opening and having its outer edge connected to the under wall of the conduit 10, while each baffle 15 is secured to a rod 16 which passes through its apex, the outer edge being spaced from the inner surface of conduit 10. Rod 16 may be supported by spiders 17, 17$^a$ at the upper and lower portions respectively, of conduit 10.

Connected to the upper end of conduit 10 above the cap 7 is a gas main 18 leading from a generator (not shown), such as a gas producer, through which hot gas flows under pressure from the producer into conduit 10. The gas in main 18 may be forced by a blower (not shown), if desired into conduit 10, so as to maintain an even pressure of impure gas flowing to the scrubber. Projected downward centrally into the upper end of conduit 10, from outside the container, is a water pipe 19. Encircling the conduit 10 within the upper portion of the container is an annular pipe 20 which may be positioned midway between the conduit 10 and the wall 1. Perforations are formed in the pipe 20, and a water supply pipe 21 passes through the cover 7 and connects with pipe 20 at 21$^a$. Water may, therefore, be admitted to conduit 10, and cascade over the baffles to the lower end of said conduit; and a spray or rain of water may be forced out of the perforations in pipe 20 to fall downward in the space between conduit 10 and wall 1 of the container. A gas outlet pipe 22 conveys purified gas from the upper portion of the container to the place of use or storage, and in practice a pump or blower (not shown) may create a draft in said pipe 22 to draw gas from the scrubber in a well known and customary manner.

In use, the annular space between the conduit 10 and the wall 1 above the grating 5, to within a suitable distance of the spray pipe 20, will be filled with coke or other suitable scrubbing material, the scrubbing material resting on the grating 5.

Secured water tight to the lower end of the wall 1, as at 23, is an inner wall 24, the upper edge 25 of which is horizontally disposed a suitable distance above the baffle 12 and discharge end 11 of gas inlet conduit 10. Said inner wall 24 is so spaced from wall 1 as to provide an endless water receiving channel between it and the wall 1; and the wall 24 for this purpose may have its lower end expanded and riveted to the wall 1 as shown at 23.

Tapped through the wall 1 into the channel formed by wall 24 and below the upper edge thereof is a pipe 26 which constitutes a draw-off conduit for tar, oil or other floatable material. Pipe 26 may be equipped with a valve 27.

Leading into the lower end of container 1 below the baffle 12 is a water inlet pipe 28 equipped with a valve 29.

In operation gas from a producer or other generator is conducted through main 18 into gas inlet conduit 10 and passes downward therethrough, being baffled by the conoidal baffle members 14 and 15 and forced into contact with water falling from pipe 19 which cascades in films on its way to the discharge end of the outlet conduit. This treatment removes heat from the gas and condenses the condensible oil and tar vapors that accompany it. The gas and oils (which are lighter than water) seek to rise after leaving the discharge end of conduit 10. The perforated baffle prevents them from boiling violently upward close to the conduit 10, and the gas and oil are forced to spread and find their way through the several orifices 13 and are thence distributed widely through the water seal passing upward through it in a plurality of small bubbles or streams at reduced pressure. In this manner the tar becomes well separated from the gas. Further, as the gas rises from the surface of the water seal it is obliged to pass through a rain of drops falling from the scrubbing coke and be still further cleaned. The gas then finds its way upward between the wet particles of scrubbing material so that by the time it passes out through gas outlet 22 it is clean enough to be burned successfully in the cylinders of internal combustion engines or elsewhere. The oil and tar separated from the gas floats on the surface of the water seal and continually overflows the upper edge of partition 24 into the annular channel whence it is continually drawn off through pipe 26 and is recovered as a valuable by-product. Ordinarily the wash water falling from above adequately supplies the water seal. The water seal may, however, be supplied through pipe 28, or both means of supply may be used together, or as need requires. The pressure of the gas will displace the water from within the tube 6 so that the gas may bubble up through the liquid. The difference of pressure between the conduit 10 and gas outlet 22 necessary to force the gas through the water seal can be produced and governed by a blower in main 18 and the usual blower or pump in outlet 22 is hereinafter suggested.

Having described my invention, what I claim is:—

1. In apparatus for separating oil, tar or other substances from gas produced from coal or the like, the combination of a container, a gas inlet conduit entering said container and extending downward therein, said conduit having, about its discharge end, a baffle provided with a plurality of perforations, a draw-off conduit, and means adapted to maintain water at a constant level above said baffle and the discharge end of the gas inlet conduit, said draw-off conduit being adapted to continually draw off oil and tar washed from the gas, means for showering scrubbing water within the container in the space between the gas inlet conduit and the wall of the container, and a gas outlet.

2. In apparatus for separating oil, tar or other substances from gas produced from coal or the like, the combination of a container, a gas inlet conduit entering said container and extending downward therein, said conduit having, about its discharge end, an inverted disk shaped baffle, said baffle being provided with a plurality of peforations the total area of which is greater than the cross sectional area of the inlet conduit, a draw-off conduit, and means adapted to maintain water at a constant level above said baffle and the discharge end of the gas inlet conduit, said draw-off conduit being adapted to continually draw off the oil and tar washed from the gas, and means for showering scrubbing water within the container in the space between the gas inlet conduit and the wall of the container, and a gas outlet.

3. In apparatus for removing oil, tar and other substances from gas produced from coal or the like, the combination of a container, a gas inlet conduit entering said container and extending downward therein said conduit having an enlarged lower discharge end adapted to distribute widely the gas issuing therefrom, a water inlet pipe discharging into the lower portion of the container, and a draw-off conduit above the lower end of the gas inlet conduit, means adapted to maintain the water at a constant level and continually draw off the tar and oil washed from the gas, and a gas outlet.

4. In apparatus for removing oil, tar and other substances from gas produced from coal or the like, the combination of a container, a gas inlet conduit entering said container, extending downward therein, and discharging near the bottom thereof, an inner wall surrounding the lower end of said inlet conduit having its upper edge above the discharge end of said conduit and forming, with the outer wall of the container, an endless channel for receiving liquid overflowing said inner wall, a pipe for admitting water into the lower portion of said container, and a draw-off conduit having its entrance end disposed below the top of said inner wall for continuously drawing off oil and tar overflowing into the endless channel, and an outlet for the washed gas.

5. In apparatus for separating oil, tar and other substances from gas produced from coal or the like, the combination of a container, a gas inlet conduit entering said container and extending downward therein, said conduit having an enlarged lower discharge end adapted to distribute widely the gas issuing therefrom, an inner wall surrounding the lower end of said inlet conduit, having its upper edge above the discharge end of said conduit, and forming, with the outer wall of the container, an endless channel for receiving liquid overflowing said inner wall, means for showering scrubbing water within said container in the space between the gas inlet conduit and the wall of the container, a draw-off conduit having its entrance end disposed below the top of said inner wall for continuously drawing off the oil and tar overflowing into the endless channel, and an outlet for the washed gas.

6. In apparatus for separating oil, tar and other substances from gas produced from coal or the like, the combination of a container, a gas inlet conduit entering said container and extending downward therein, said conduit having an inverted disk shaped baffle at its lower end, said baffle being provided with a plurality of perforations the total area of which is greater than the cross sectional area of the inlet conduit, an inner wall surrounding the lower end of said inlet conduit having its upper edge above the discharge end of said conduit, and forming with the outer wall of the container an endless channel for receiving liquid overflowing said inner wall, a pipe for admitting water into the lower portion of said container, means for showering scrubbing water within said container in the space between the gas inlet conduit and the wall of the container, a draw-off conduit having its entrance end disposed below the top of said inner wall for continuously drawing off the oil and tar over-flowing in to the endless channel, and an outlet for the washed gas.

In testimony whereof I affix my signature.

HORACE G. JOHNSTON.